United States Patent
Huang

(10) Patent No.: US 6,499,390 B1
(45) Date of Patent: Dec. 31, 2002

(54) ELECTRIC FRYING POT

(76) Inventor: Jin Yi Huang, No. 35, Zsha Lun, Jon Zsha Village, Antin Shiang, Tainan Hsien (TW)

(*) Notice: Subject to any disclaimer, the term of this patent is extended or adjusted under 35 U.S.C. 154(b) by 333 days.

(21) Appl. No.: 09/885,753

(22) Filed: Jun. 19, 2001

(51) Int. Cl.⁷ .................. A23L 1/00; A47J 27/00; A47J 27/06; A47J 37/00; H05B 1/02

(52) U.S. Cl. .............. 99/331; 99/337; 99/403; 219/492; 219/497; 219/453; 219/506; 220/314; 220/912

(58) Field of Search ............ 99/325–333, 337, 99/338, 403–410, 444–450, 483; 126/369, 39 G, 39 R; 219/492, 494, 497, 453, 506, 501, 448, 452; 220/592, 314, 316, 912; 324/663, 686; 426/510, 511, 523, 231, 233

(56) References Cited

U.S. PATENT DOCUMENTS

| | | | | |
|---|---|---|---|---|
| 3,806,701 A | * | 4/1974 | Scott | 219/438 |
| 3,908,111 A | * | 9/1975 | Du Bois et al. | 219/442 |
| 4,005,645 A | * | 2/1977 | Janssen | 99/403 |
| 4,039,777 A | * | 8/1977 | Baker | 219/442 |
| 4,298,789 A | * | 11/1981 | Eichelberger et al. | 219/521 X |
| 4,307,287 A | * | 12/1981 | Weiss | 219/432 X |
| 4,932,527 A | * | 6/1990 | Hayes | 99/331 |
| 5,348,187 A | * | 9/1994 | Schultz | 126/373 X |
| 5,355,777 A | * | 10/1994 | Chen et al. | 99/410 X |
| 5,400,700 A | * | 3/1995 | Bois | 99/403 |
| 5,520,103 A | * | 5/1996 | Zielinski et al. | 126/246 X |
| 5,673,611 A | * | 10/1997 | Tieman | 99/415 X |
| 5,701,805 A | * | 12/1997 | Sa | 99/331 |

* cited by examiner

Primary Examiner—Timothy F. Simone
(74) Attorney, Agent, or Firm—Pro-Techtor International Services

(57) ABSTRACT

An electric frying pot includes an outer pot body. and an inner pot. The outer pot body is provided with plural support members and a socket on its bottom base having a. micro-switch fixed under to connect the socket. The socket has two notches and an inserting groove on top and a sliding cover inside, a ring electric-heating tube fixed at the bottom of the inner pot, having two thirds embedded therein and two pins protruding at two opposite ends, with an actuating rod longer then the pins fixed between. Thus, when the inner pot is placed in the outer pot body, the actuating rod pushes the sliding cover to move away to let the actuating rod and the pins respectively inserting in the inserting grooves and the notches, synchronously with the bottom of the inner pot pressing the lug of the micro-switch to turn on power.

3 Claims, 10 Drawing Sheets

ELECTRIC FRYING POT

BACKGROUND OF THE INVENTION

This invention relates to an electric frying pot, particularly to one possible to elevate heat conductive efficiency, preventing its components from carbonizing and accordingly possible to lower manufacturing cost.

A conventional electric frying pot consists of an outer pot body with a cover pivotally mounted around its top and an inner pot placed in a hollow interior of the outer the pot body. A socket is provided inside the outer pot body connected with both a power supply and a temperature controlling button, and a ring electric-heating tube 220 is fixed at the bottom of the inner pot 20, as shown in FIG. 1, with one third of the tube body of the electric-heating tube embedded fixedly within the bottom of the inner pot and the rest portion exposing under the inner pot. Besides, the electric-heating tube 220 has two pins protruding downward at two opposite ends to be inserted in the socket of the outer pot body, and the outer pot body has a heatproof plate made of heatproof material provided around its inner wall. Thus, after the inner pot is placed in the outer pot body and the pins of the electric-heating tube are inserted in the socket, the electric-heating tube is powered to generate heat and render the inner pot hot enough to fry food and high temperature produced in the process of heating is isolated by the heatproof plate, impossible to transmit to the outer pot body.

However, such conventional electric frying pot has been found to have some defects described below.

1. The pins of the electric-heating tube are inserted in the socket of the outer pot body to make the electric-heating tube transmit electricity and generate heat, but the conventional socket is generally positioned in open state with its contact point exposing directly, liable to give rise to accident in case of cleaning.

2. When the pins of the electric-heating tube are inserted in or pulled off the socket, it is liable to result in sparks due to instant conducting and cutting off electricity, thus easily to make the pins carbonized after a long-term use.

3. Only one third of the electric-heating tube is embedded in the bottom of the inner pot, and in other words, only one third of the heat is directly transmitted to the inner pot and the other two thirds of the electric-heating tube is exposed between the heatproof plate and the inner pot, thus resulting in poor efficiency of heat conducting. Besides, in order to prevent the heat given out by the exposed electric-heat tube from transmitting to the outer pot body, a large heatproof plate has to be provided around the inner wall of the pot body, thus increasing its manufacturing cost.

SUMMARY OF THE INVENTION

The objective of the invention is to offer an electric frying pot possible to enhance efficiency of heat transmitting, preventing its components from carbonizing and accordingly possible to lower its manufacturing cost.

To achieve such a goal, an electric frying pot in this invention is designed in particular, including an outer pot body having a cover pivotally provided on top and an inner pot placed in the outer pot body. A bottom base made of heatproof material is fixedly provided inside the pot body, having plural protruding-up support members and a socket connecting with a power supply, and a heatproof plate is fitted in the inner wall of the outer pot body. A metallic net basket is placed in the inner pot and a ring electric-heating tube is fixedly disposed at the bottom of the interior pot, having two pins protruding downward from two opposite ends to be received in the socket of the bottom base.

The feature of the invention is the outer pot body having plural support members inside and one of them having a press rod protruding downward to contact with a micro-switch, which is connected to the socket and a temperature controller. The socket is a recessed casing with its opening facing downward, having three connecting feet provided inside, and two notches corresponding to the three feet for receiving two pins of the electric-heating tube and an inserting groove positioned between two notches. The socket is further provided inside with a sliding cover pushed against by a spring to close up its notches and inserting groove. The sliding cover has two notches and an inserting groove conforming to the two notches and the inserting groove of the socket and a push-stop block is formed integral on top extending in the inserting groove of the socket. An electric-heating tube has its two thirds embedded in the bottom of the inner pot and an actuating rod protruding downward, facing the inserting groove of the socket. Thus, when the inner pot is put into the outer pot body, the actuating rod at the bottom of the interior pot will rest on the push-stop block and then apply force to push the slide cover to move horizontally and press the spring to shrink back to let the notches and the inserting groove of the sliding cover face exactly the notches and the inserting groove of the socket, thus, the actuating rod and the pins of the electric-heating tube will pass through the notches and the inserting grooves of both the socket and the sliding cover and contact with the connecting feet in the socket. Synchronously the bottom of the inner pot will touch the press rod of the support member and let the press rod rest against the lug of the micro-switch to turn on power. According to such a design, the pins of the electric-heating tube are first combined with the socket and subsequently the micro-switch controls the pins of the electric-heating tube and the socket to have power on, thus avoiding producing sparks, preventing the pins from carbonizing and elevating heat transmitting efficiency as well as reducing the size of a heatproof plate.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
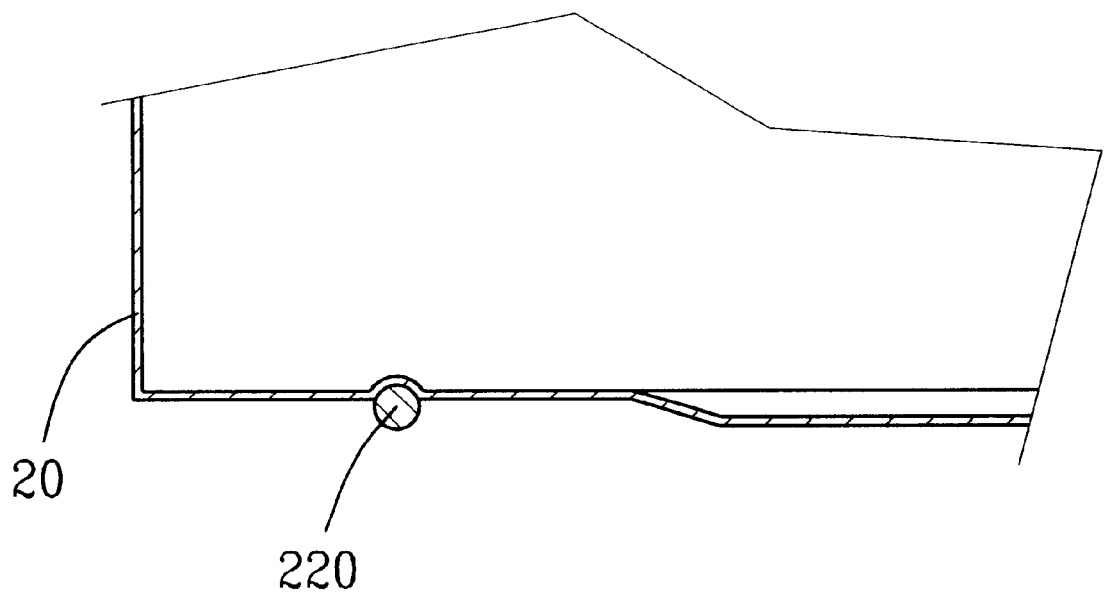
FIG. 1 is a cross-sectional view of a conventional inner pot.
Figure 6:
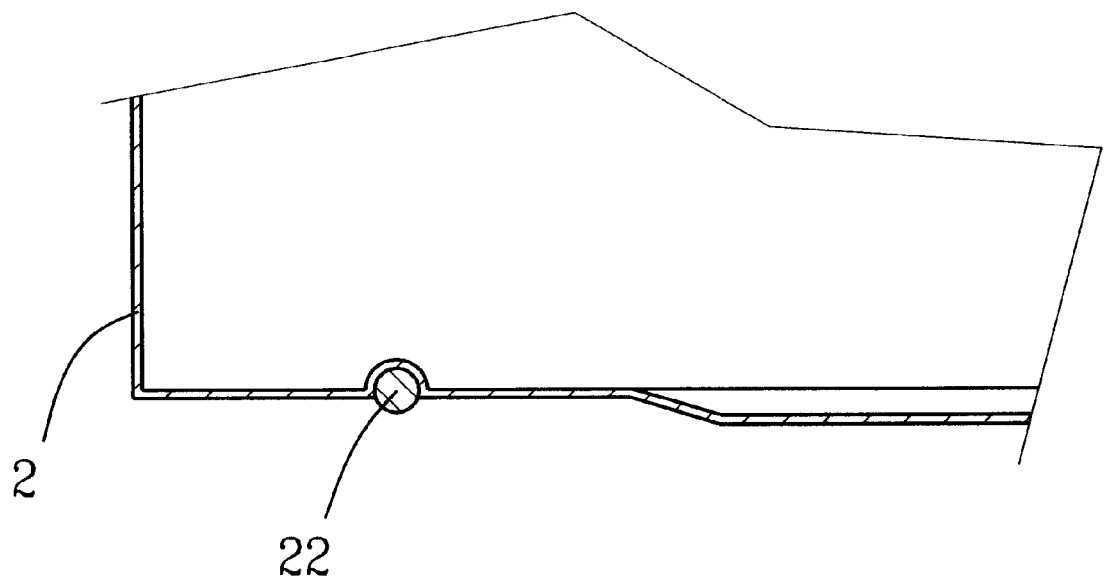
FIG. 6 is a cross-sectional view of the inner pot in the present invention.
Figure 2:
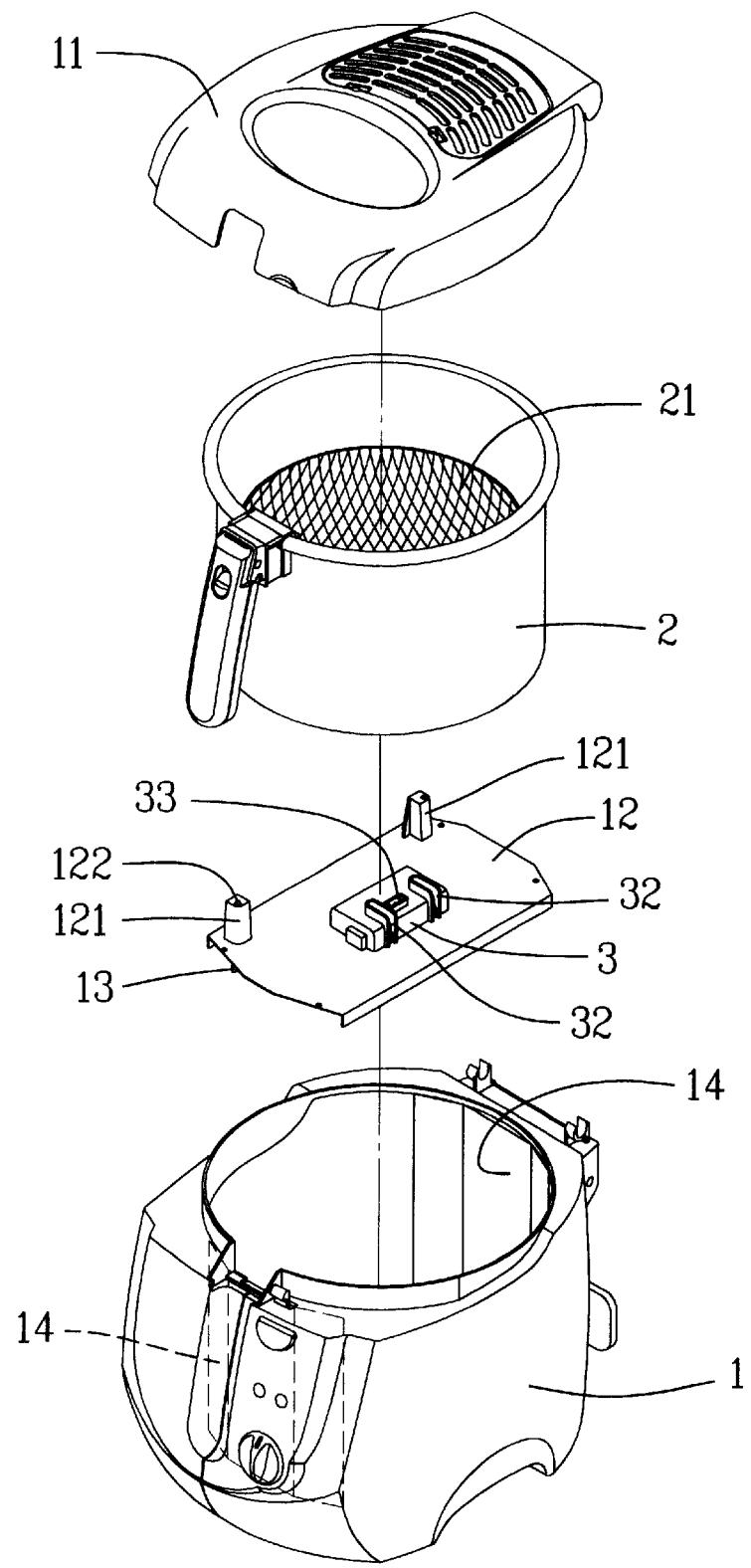
FIG. 2 is an exploded perspective view of an electric frying pot in the present invention.

A preferred embodiment of an electric frying pot, as shown in FIG. 2, includes an outer pot body 1, a cover 11, and an inner pot 2 as main components combined together.

Figure 3:
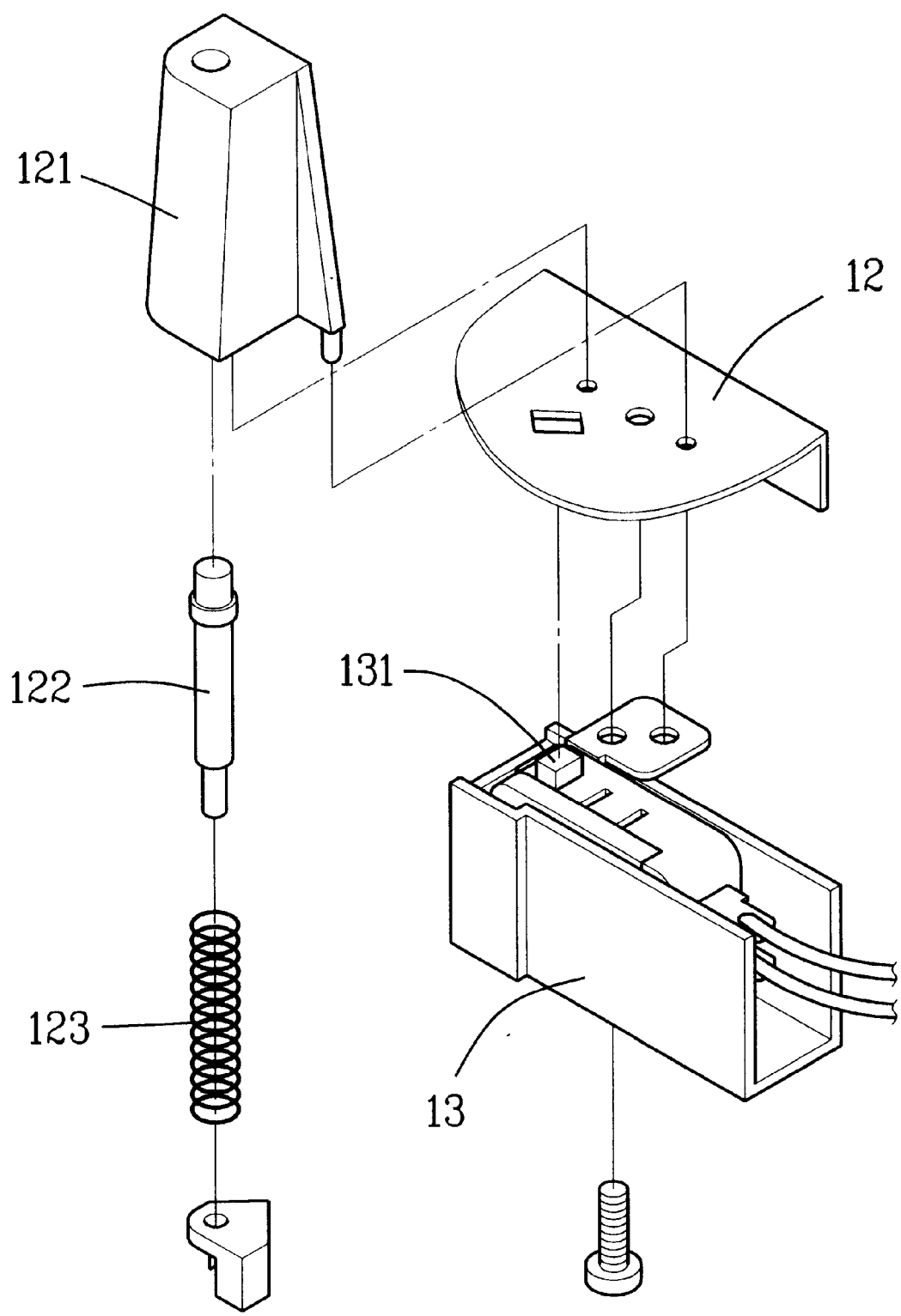
FIG. 3 is a partial magnified view of the electric frying pot in the present invention.
Figure 4:
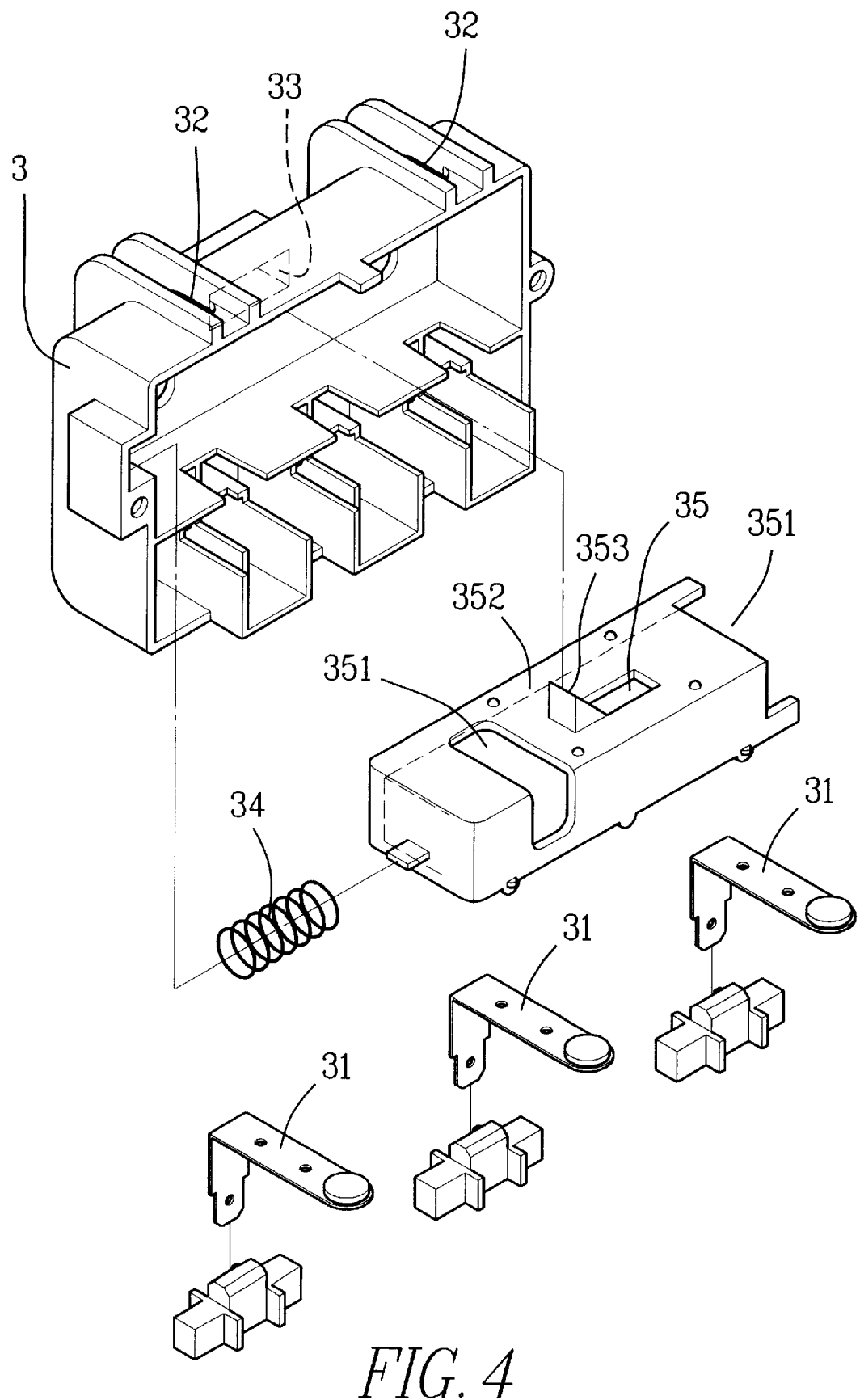
FIG. 4 is an exploded perspective view of the socket and the sliding cover of the electric frying pot in the present invention.
Figure 5:
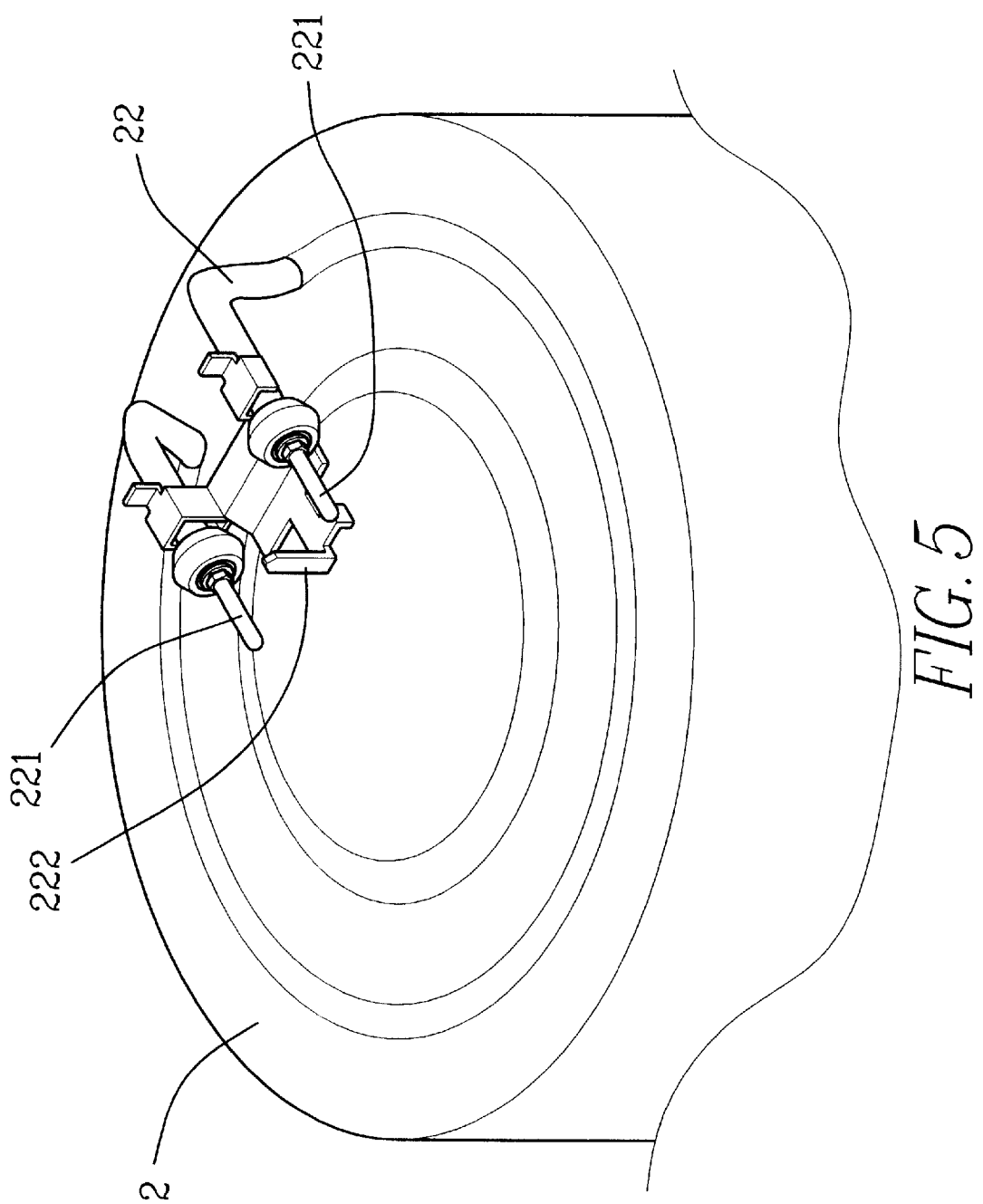
FIG. 5 is a perspective view of the bottom of the inner pot in the present invention.

The outer pot body 1 has a bottom base 12 made of heatproof material fixed inside, and the bottom base 12 has plural support members 121 disposed protruding up and a socket 3 provided on top. A press rod 122 is inserted in each support members 121, referring to FIG. 3, having a spring 123 fitted around its outer portion, and with its upper end extending out of each support member 121 and its lower end contacting with a lug 131 fixed on a micro-switch 13 under the bottom base 12, and the micro-switch 13 connected to the socket 3. Besides, the socket 3 is a recessed casing with its opening facing downward, as shown in FIG. 4, and has three connecting feet 31 inside respectively connected to a power supply and to the ground. Then two notches 32 are bored on top of the socket 3, conforming to its connecting feet 31, and an inserting groove 33 positioned between two notches 32, further a sliding cover 35 pushed against by a spring 34 is fitted in the socket 3, and provided with two notches 351 and an inserting groove 352 corresponding to the notches 32 and the inserting groove 33 of the socket 3, having a push-stop block 353 formed integral at one side of the inserting groove 352. In addition, a heatproof plate 14 is fitted in the front and the rear inner walls of the outer pot body 1.

The inner pot 2 is fixed with a ring electric-heating tube 22 at the bottom, with at least two thirds of the electric-heating tube 22 embedded in the interior of its bottom, as shown in Firs 5 and 6. Two pins 221 protrude out of the two opposite ends of the electric-heating tube 22 to be received in the notches 32 of the socket 3. An actuating rod 222 is fixedly provided between two pins 221, longer than the pins 221, extending downward, and corresponding to the inserting groove 33 of the socket 3 is fixedly provided between two pins 221.

Figure 7:
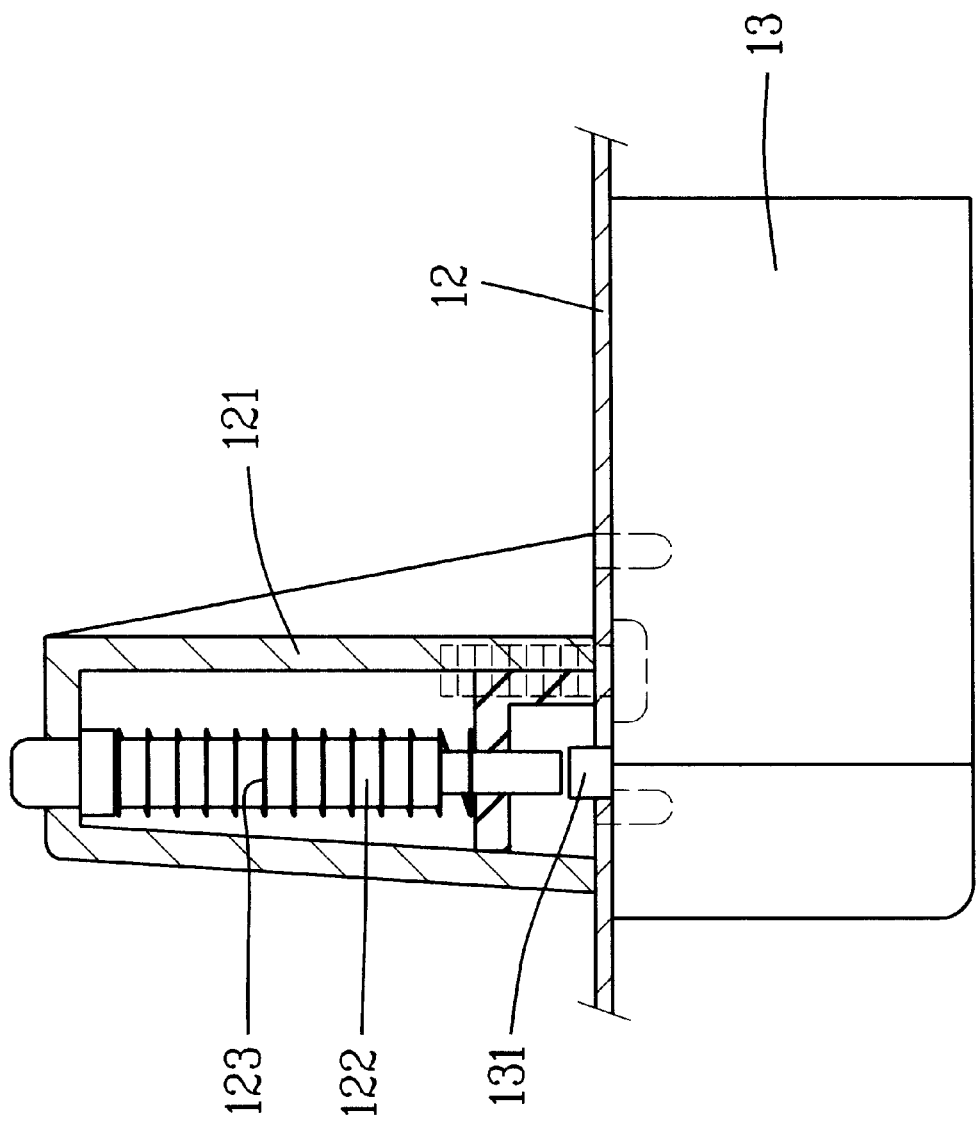
FIG. 7 is a cross-sectional view of the support member having a press rod in the present invention.
Figure 8:
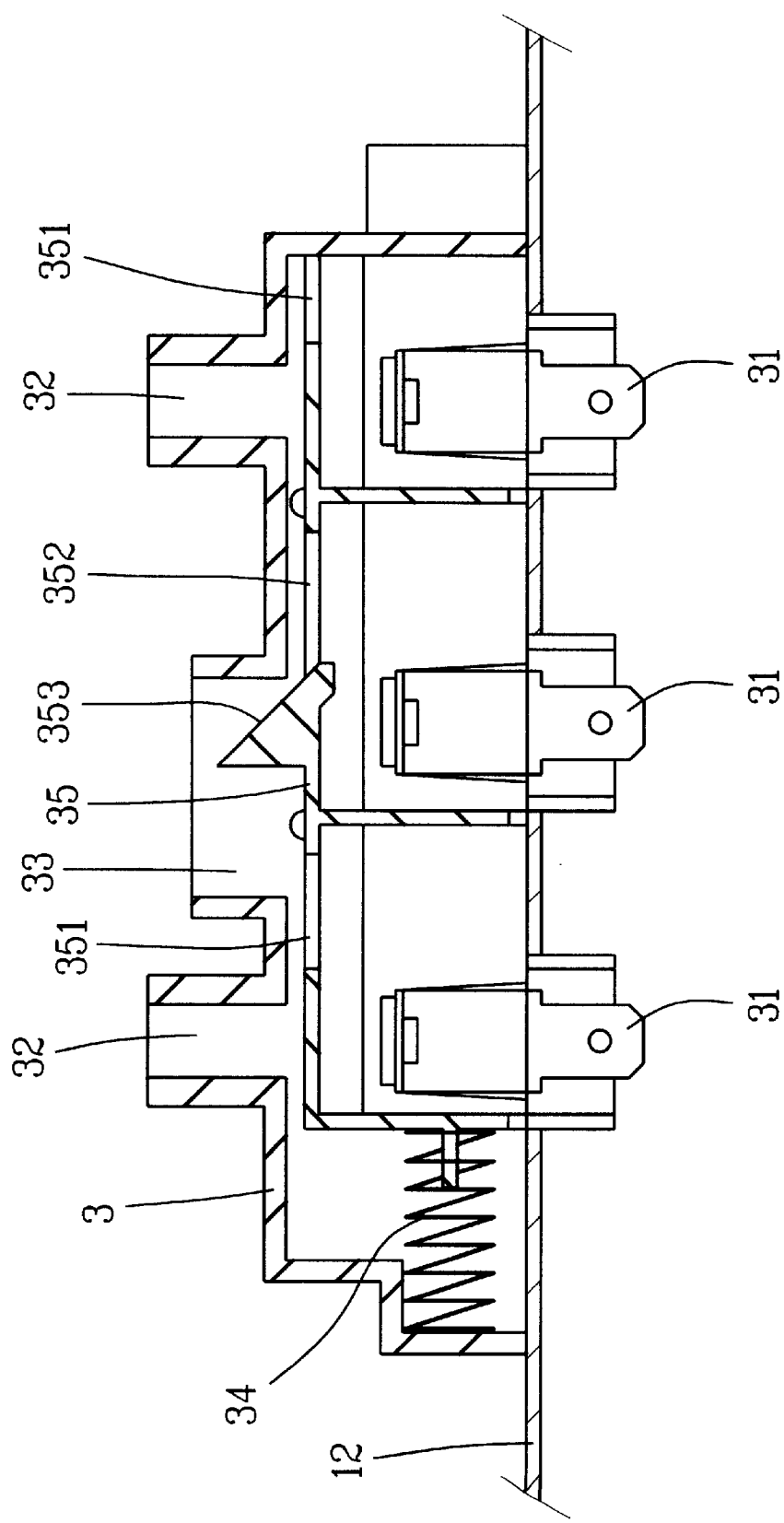
FIG. 8 is a cross-sectional view of a combination of the socket and the sliding cover in the present invention.

In assembling, as shown in FIG. 7, the press rod 122 in each support member 121 of the bottom base 12 is pushed upward by the spring 123 to keep its upper end protruding out of each support member 12 and its lower end not contacting with the micro-switch 13, letting the circuit disconnected. As for the socket, as shown in FIG. 8, the sliding cover 35 in the socket 3 is pushed forward by the spring 34 to close up the notches 32 and the inserting groove 33 of the socket 3, with the push-stop block 353 staying in the inserting groove 33 of the socket 3, the notches 351 and the inserting groove 352 of the sliding cover covered by the socket 3 and the three connecting feet 31 concealed in the socket 3, avoiding exterior other things from dropping on the connecting feet 31 or preventing a user from touching the connecting feet 311 by mistake.

Figure 9:
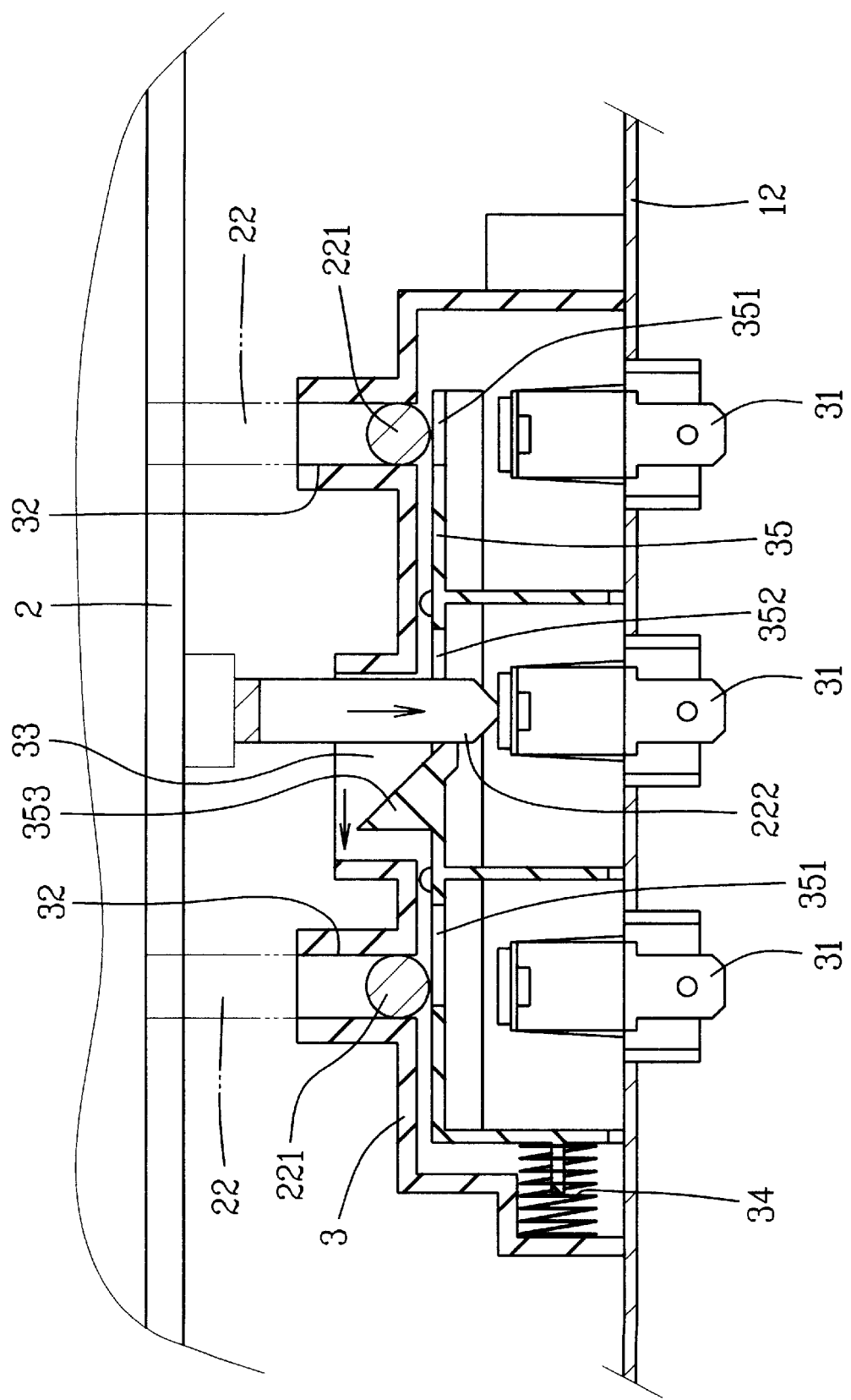
FIG. 9 is a cross-sectional view of the electric frying pot under a handling process in the present invention.
Figure 10:
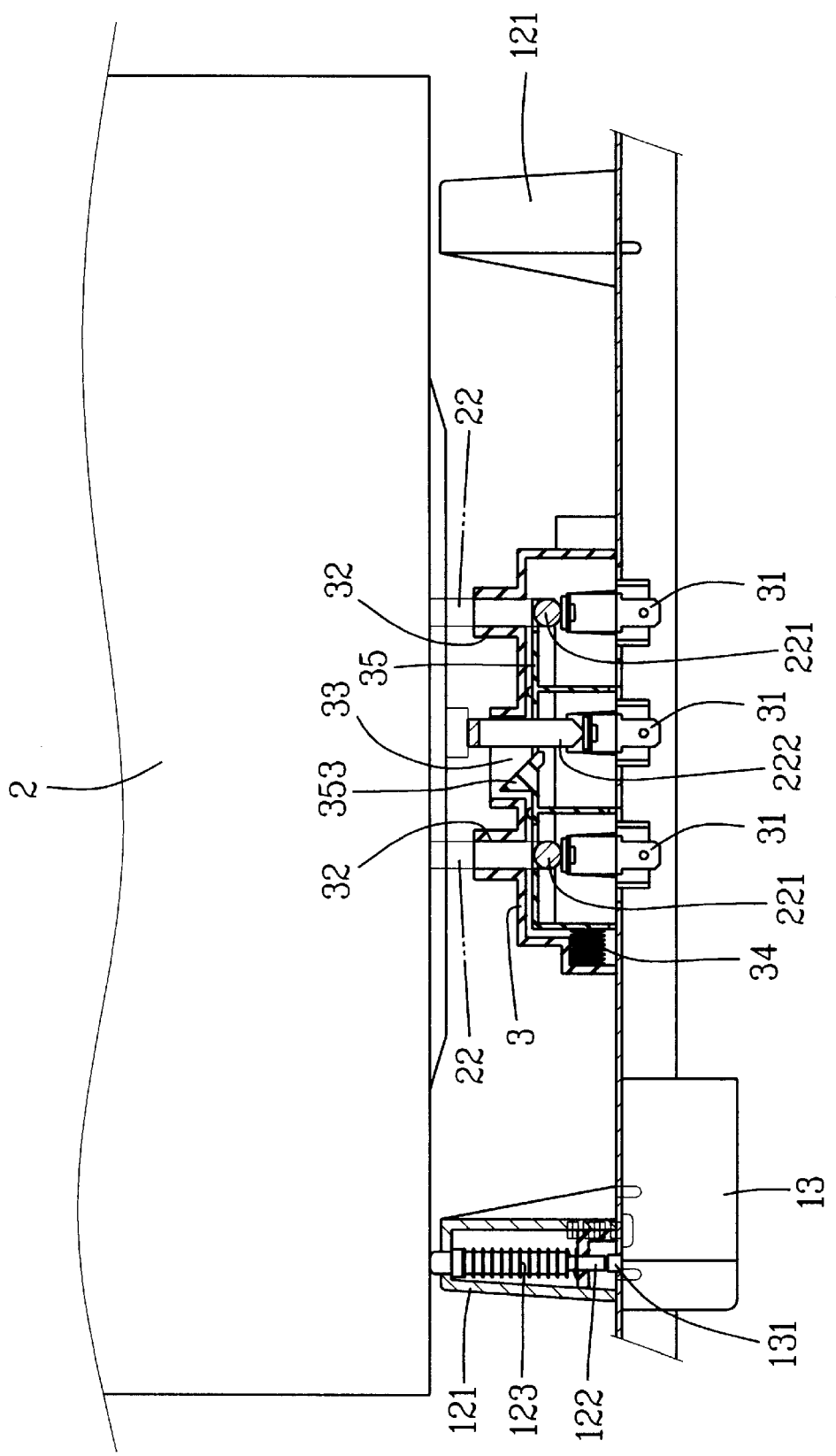
FIG. 10 is a cross-sectional view of the electric. frying pot under another handling process in the present invention.
Figure 11:
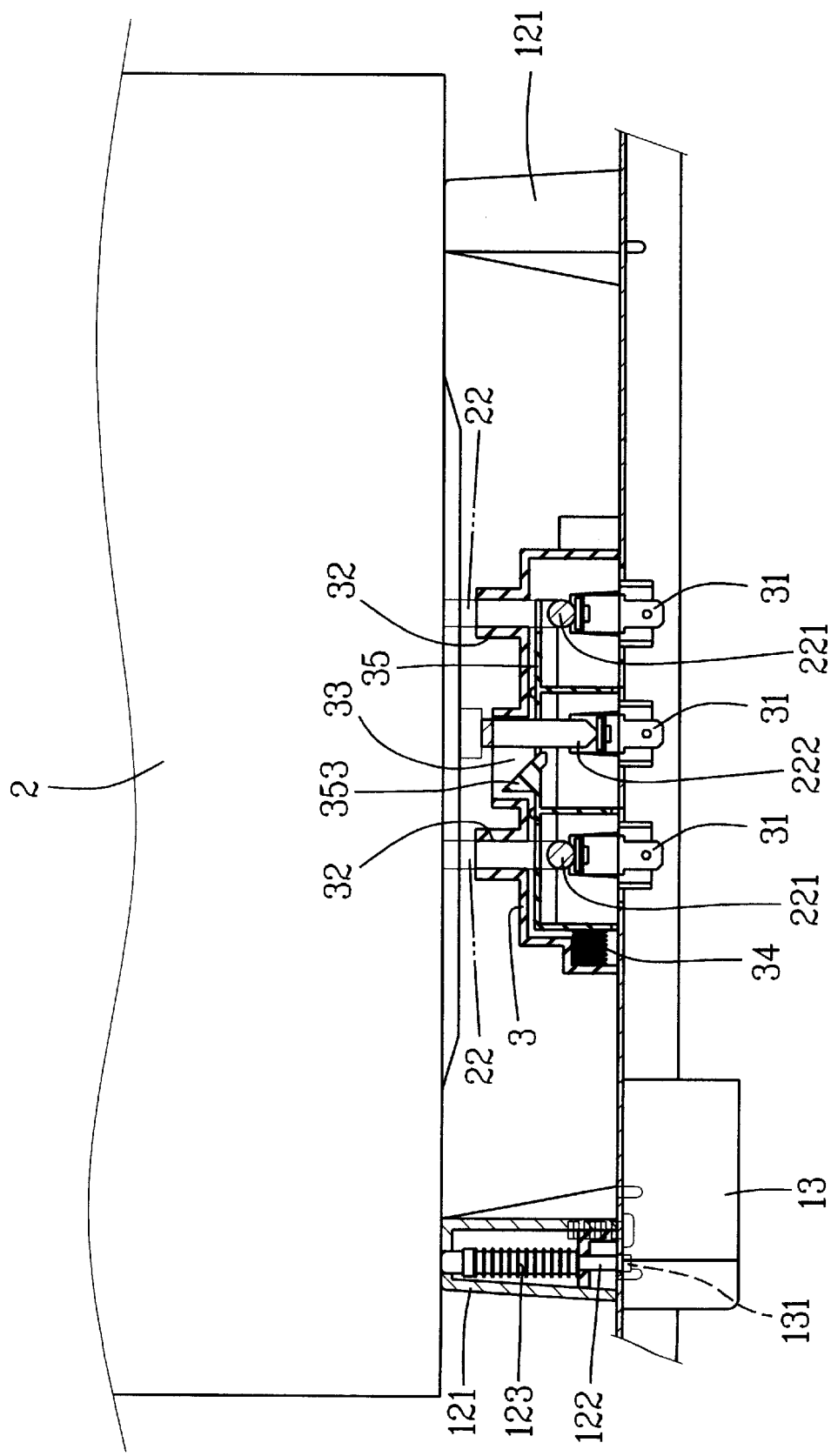
FIG. 11 is a cross-sectional view of the electric frying pot in using condition in the present invention.

In using, as shown in FIG. 9, firstly the inner pot 2 is put in the outer pot body 1 to let the actuating rod 222 in the bottom of the inner pot 2 rest on the push-stop block 353 in the inserting groove 33 of the socket 3. Then push the inner pot 2 downward to let the sliding cover 35 move horizontally toward and press the spring 34 shrink back. The notches 351 and the inserting groove 352 of the sliding cover 35 respectively face the notches 32 and the inserting groove 33 of the socket 3, allowing the actuating rod 222 and the pins 221 respectively pass through the inserting grooves 33, 352 and the notches 32, 351 of the socket 3 and the sliding cover 35 contact with the connecting feet 31. But the bottom of the inner pot 2 does not touch the support members 121 or the press rod 122 yet, as shown in FIG. 10, leaving the circuit still in cut off condition. Then keep on pressing the inner pot 2 to let its bottom completely touch the support members 121 and positioned smoothly in the outer pot body 1. Meanwhile,. the press rod 122 of each support member 121 is pressed downward, with its lower end pressing the lug 131 of the micro-switch 13 to make the circuit connected, and then turn on the temperature-controlling switch to carry on frying food. On the contrary, when the inner pot 2 is taken out of the outer pot body 1, its bottom separates from the support members 121 first so the press rods 122 are not pressed any more and accordingly pushed upward by the springs 123 to recover theri position and separated from the lug 131 of the micro-switch, letting the circuit cut off, thus producing no sparks when the pins 221 are moved apart from the connecting feet 31. In addition, after the pins 221 and the actuating rod 222 are withdrawn from the notches 32 and the inserting groove 33, the actuating rod 222 will no longer push against the push-stop block 353 of the sliding cover 35 so the spring 34 will recover to push the sliding cover 35 move forward to cover up the notches 32 and the inserting groove 33, as shown in FIG. 7.

As can be noted from the above description, this invention has the following advantages.

1. After taking out the inner pot from the outer pot body 1, the sliding cover 35 of the socket 3 is capable to move horizontally to cover up the notches 32 and the inserting groove 33 to let the three connecting feet 31 concealed in the socket, avoiding exterior other things from dropping on the connecting feet 31 and preventing a user from touching the connecting feet by mistake.

2. The pins 221 of the inner pot 2 contact with the connecting feet 31 first and, after that, make electric connection by means of the micro-switch 13 connected to the socket 3, possible to avoid sparks and prevent the pins 221 from carbonizing.

3. Aside from activating the sliding cover 35 to move, the actuating rod 222 of the inner pot also moves into the socket to contact with the foot 31 connecting to the ground to conduct static electricity out, preventing a user from troubled by static electricity.

4. At least two thirds of the electric-heating tube 22 is embedded in the bottom of the interior pot 2 so that heat generated can be entirely transmitted to the inner pot 2, enhancing heat transmitting efficiency. Besides, as only a little part of the electric-heat tube 22 exposes out, so not much heat leaks out, and only parts (a front and a rear side or a left and a right side) of the inner wall of the outer pot body 1 need to be provided with heatproof plates 14, lowering manufacturing cost.

While the preferred embodiment has been described above, it will be recognized and understood that various modifications may be made therein and the appended claims are intended to cover all such modifications that may fall within the spirit and scope of the invention.

I claim:

1. An electric frying pot comprising an outer pot body. fixed with a bottom base made of heatproof material, said bottom base having plural support members protruding up and a socket connected to a power supply, an inner wall of said outer pot body provided with a heat-proof plate made of heat-proof material, a ring electric-heating tube fixed at a bottom of said inner pot placed in said outer pot body, having two pins formed protruding out at two opposite ends to be received in said socket; and, characterized by a micro-switch fixed under said bottom base of said outer pot body, said micro-switch having a lug to be connected to said socket, said socket being a recessed casing with its opening facing downward and having three connecting feet provided inside, said socket further having two notches and an inserting groove facing said three connecting feet, said notches of said socket receiving said pins of said electric-heating tube, a spring provided inside said socket to elastically push against a sliding cover in said socket to close up said notches and said groove of said socket, said sliding cover also having notches and inserting groove facing said notches and said inserting groove of said socket and having a push-stop block formed integral on top and extending in said inserting groove of said socket; two thirds of said electric-heating tube embedded in the bottom of said inner pot, an actuating rod longer than said pin positioned between said two pins of said electric-heating tube and protruding downward and facing the inserting groove of said socket, said inner pot placed in said outer pot body, said actuating rod under the bottom of said interior pot reaching and resting on said push-stop block in said inserting groove of said socket and pushing said sliding cover to move horizontally and press said spring to shrink back, thus said notches and said inserting groove of said sliding cover aligned with said notches and said inserting groove of said socket, at the same time said actuating rod and said pins passing through these said notches and grooves and contacting with said connecting feet, the bottom of said inner pot pressed against said lug of said micro-switch to turn on power.

2. The electric frying pot as claimed in claim 1, wherein said micro-switch is fixed under one of said support members of said bottom base and a press rod fitted around by a spring and provided in each said support member, with its upper end protruding out of each said support member and its lower end facing said lug of said micro-switch, the bottom of said inner pot pressing said press rod and let it move downward to push said lug of said micro-switch to turn on power when said inner pot is put into said outer pot body.

3. The electric frying pot as claimed in claim 1, wherein said push-stop block on said sliding cover is in a cone shape.

* * * * *